Oct. 19, 1926.

T. MIDGLEY 1,603,855

METHOD AND MACHINE FOR MAKING CORD TIRES

Original Filed March 20, 1919    15 Sheets-Sheet 2

INVENTOR.
Thomas Midgley
BY Chapin + Neal
ATTORNEYS.

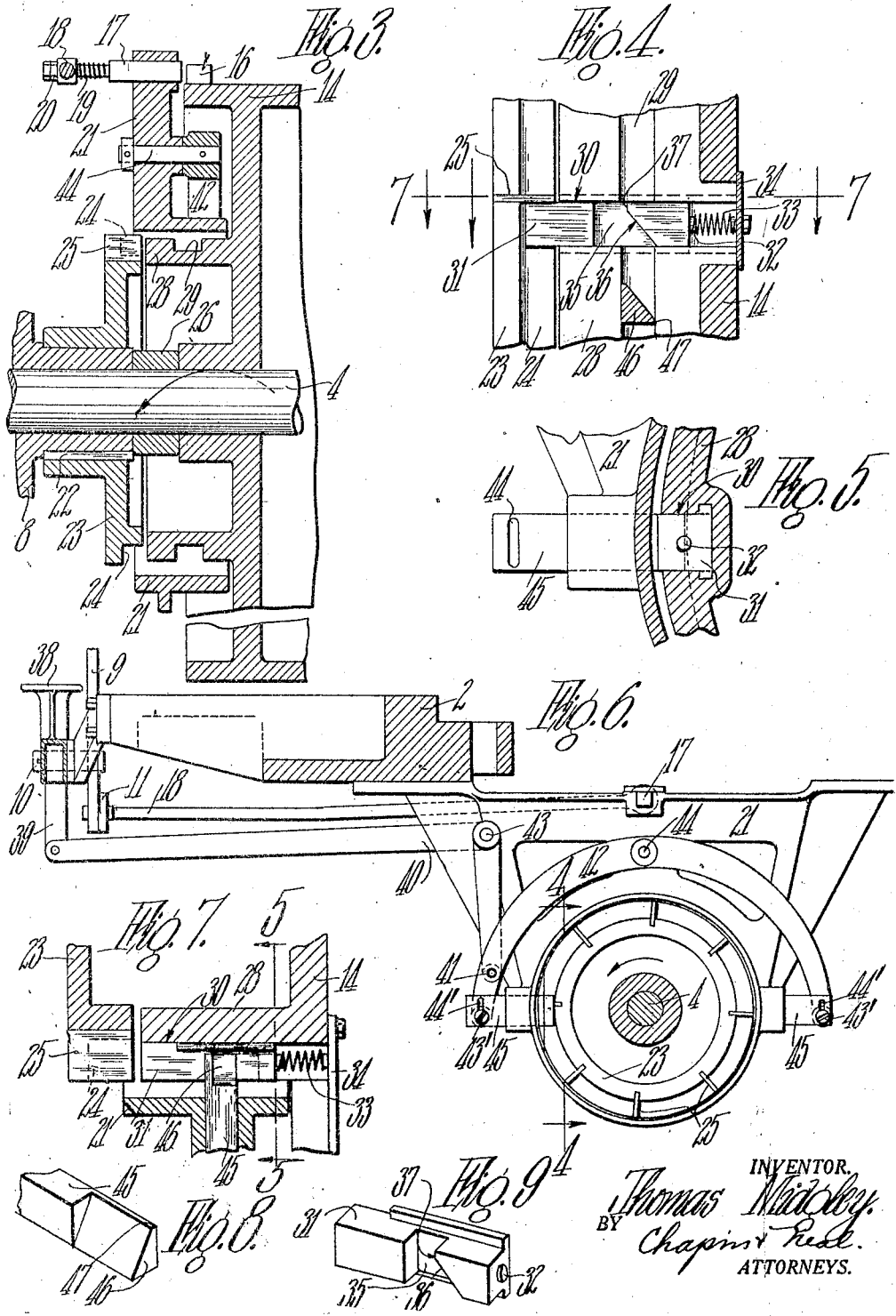

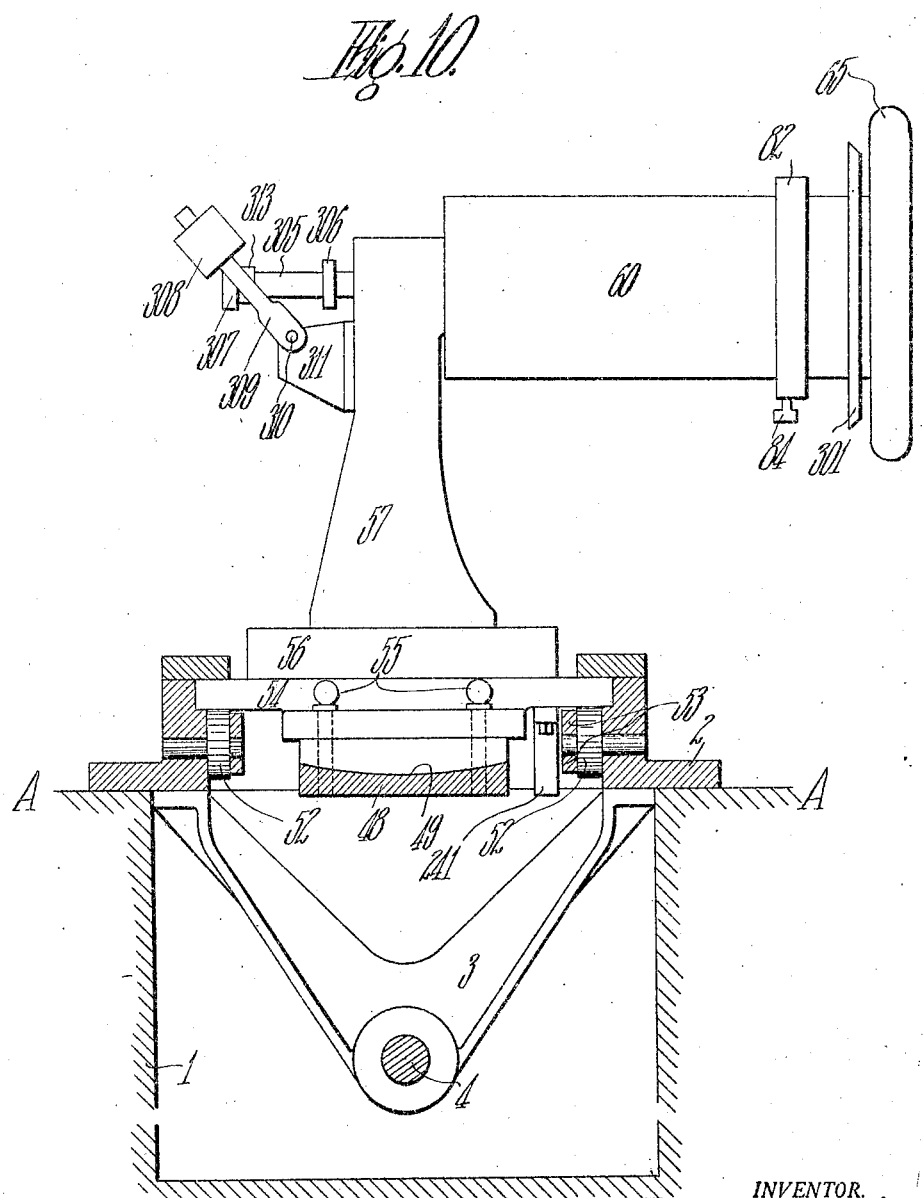

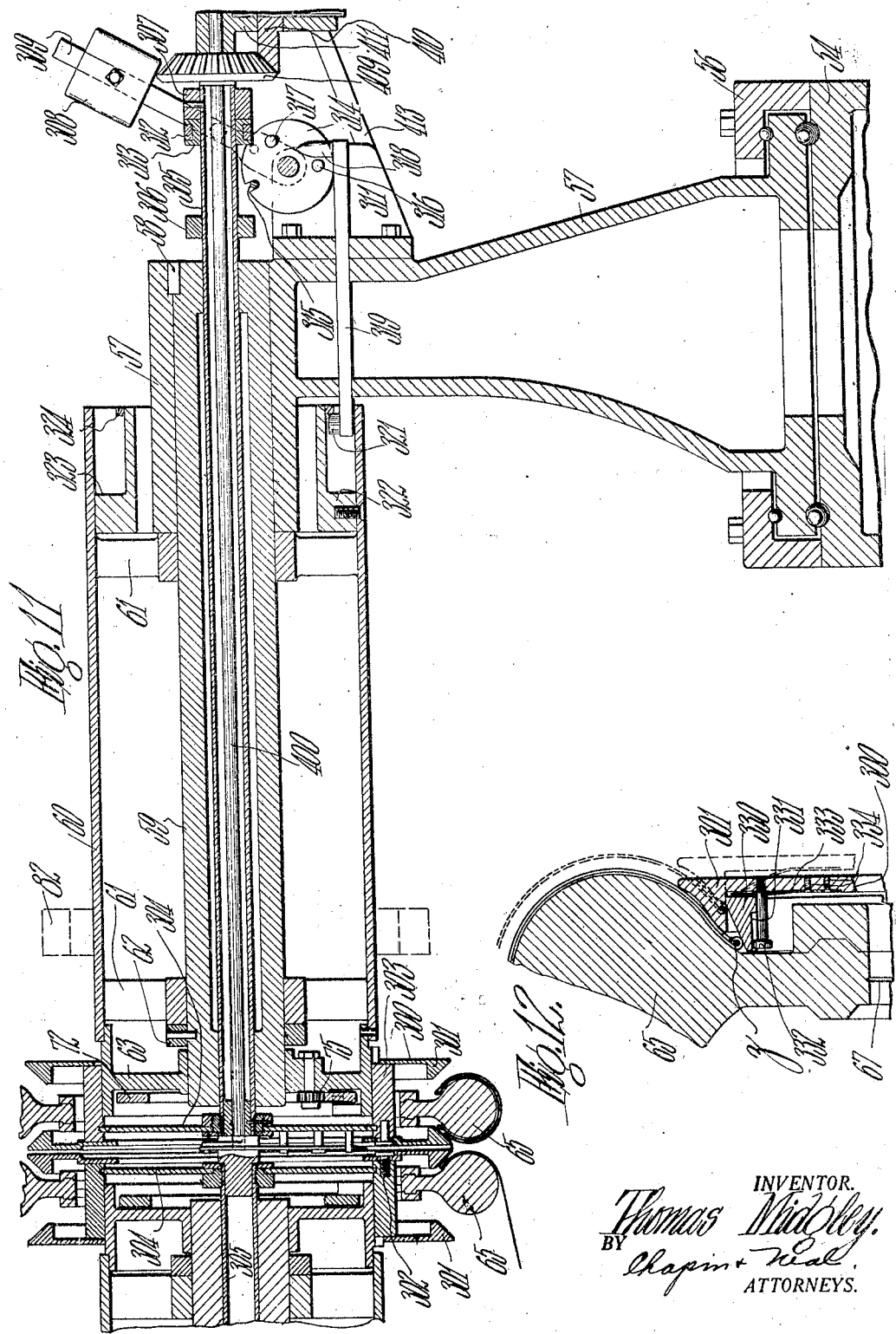

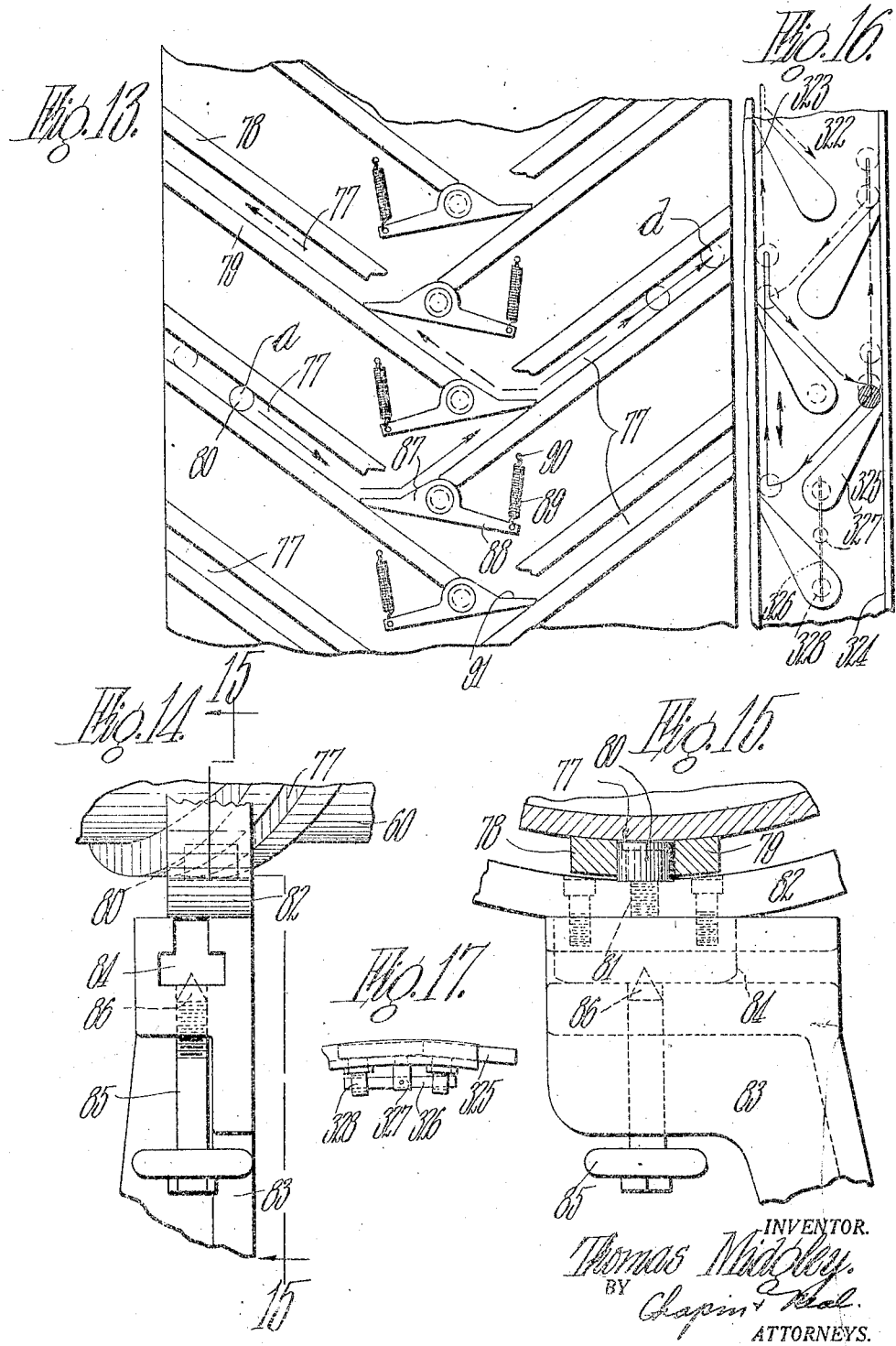

Oct. 19, 1926.
T. MIDGLEY
1,603,855
METHOD AND MACHINE FOR MAKING CORD TIRES
Original Filed March 20, 1919   15 Sheets-Sheet 7
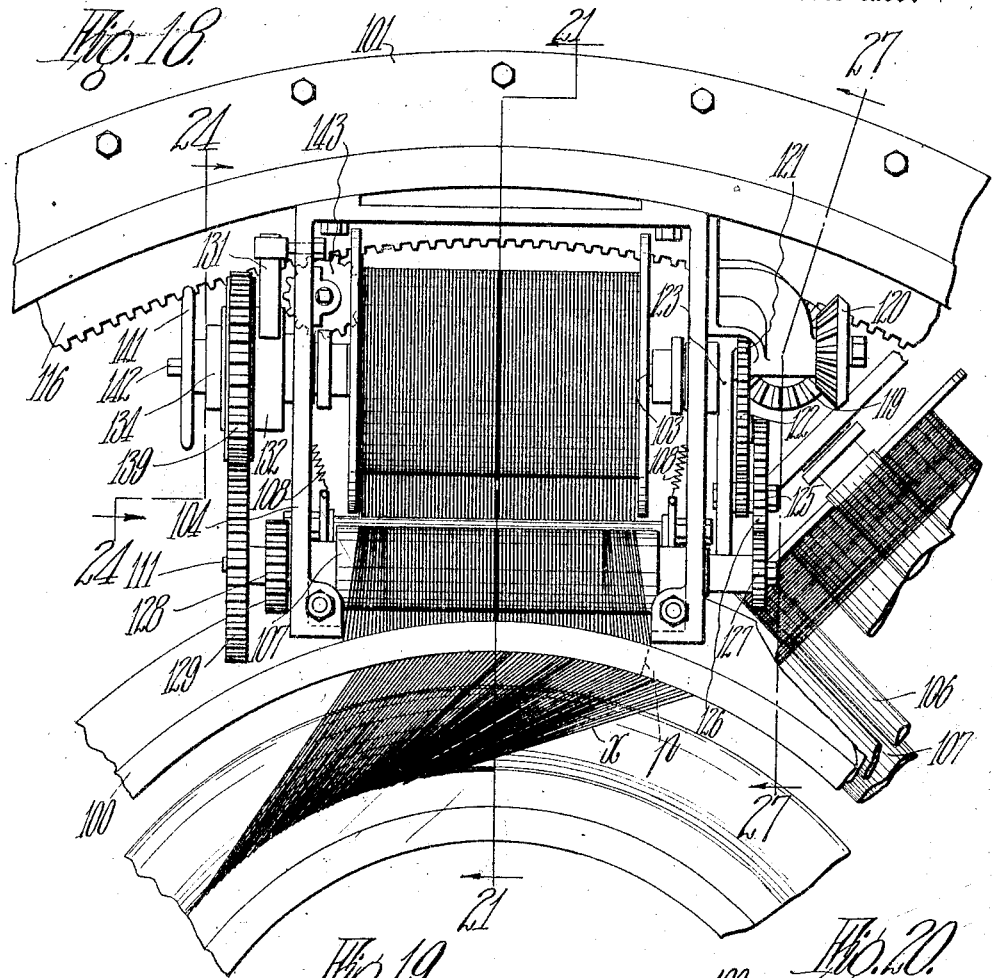
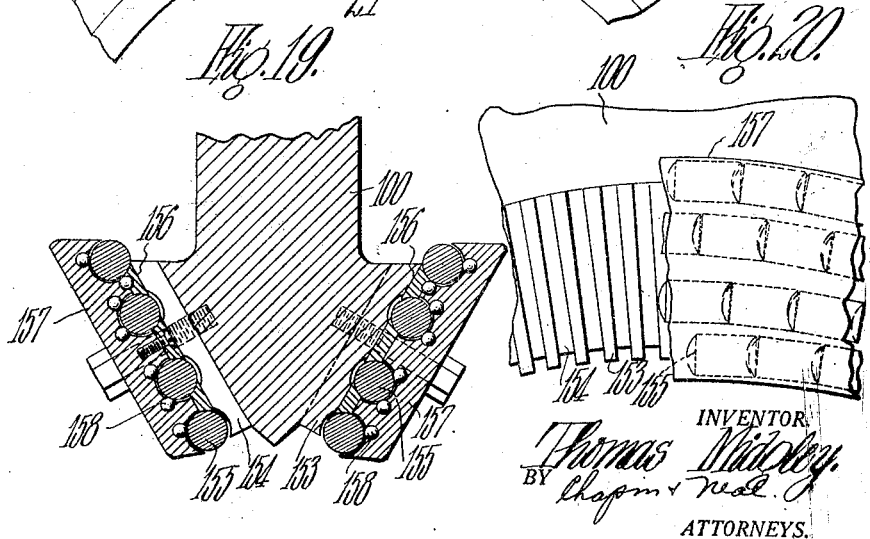
INVENTOR
Thomas Midgley
BY Chapin + Neal
ATTORNEYS

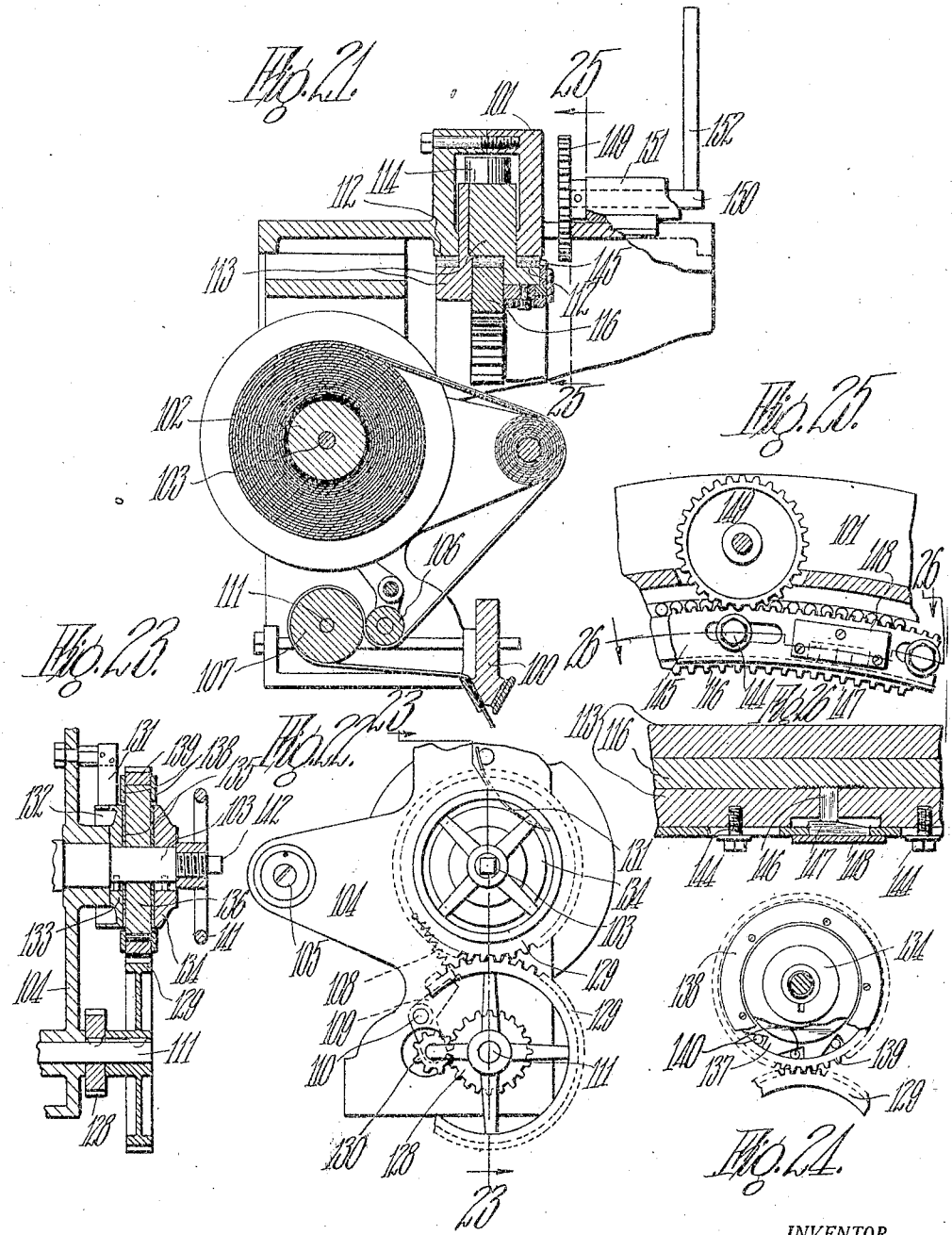

Oct. 19, 1926.

T. MIDGLEY 1,603,855

METHOD AND MACHINE FOR MAKING CORD TIRES

Original Filed March 20, 1919    15 Sheets-Sheet 9

INVENTOR.
Thomas Midgley.
BY Chapin & Neal.
ATTORNEYS.

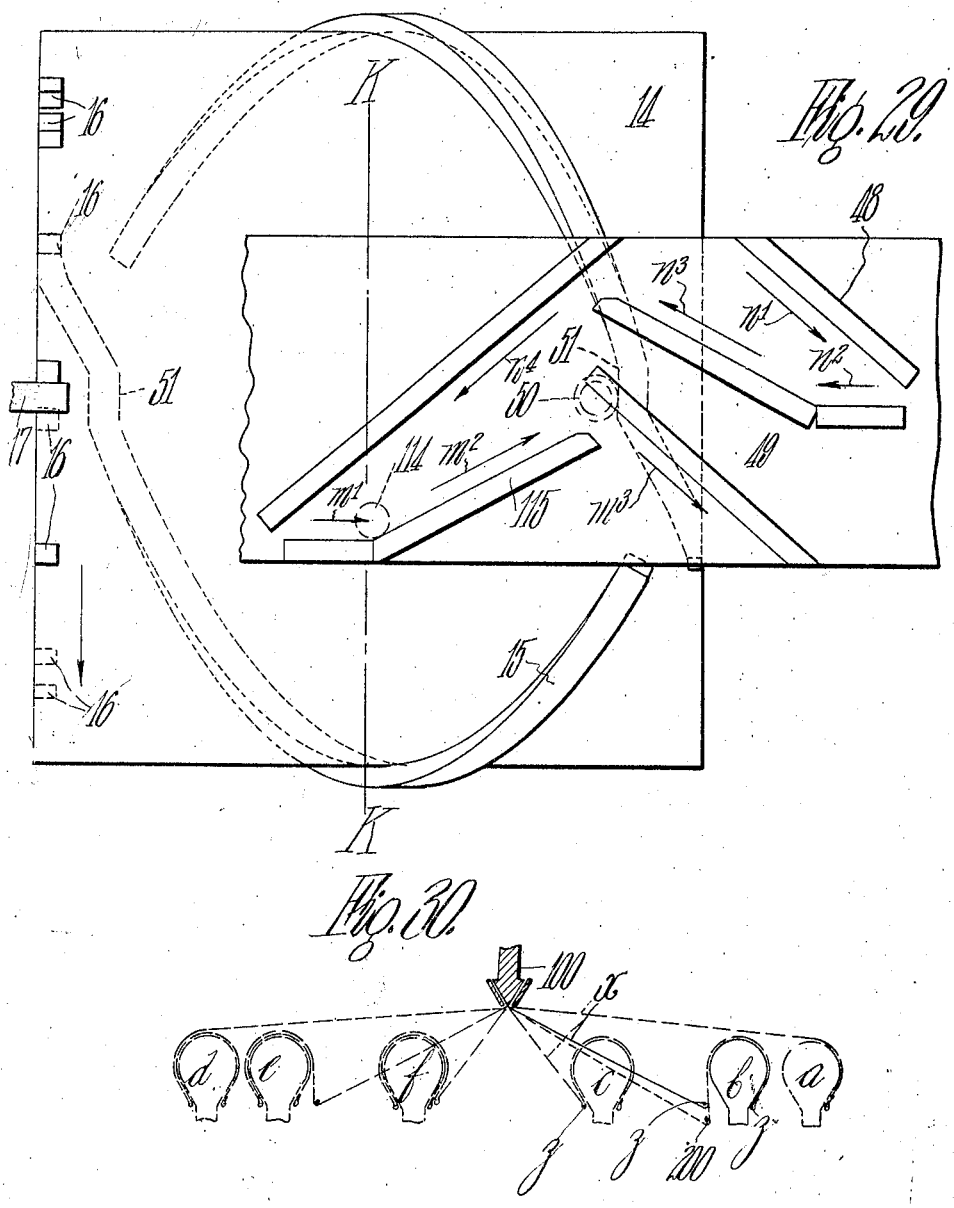

Oct. 19, 1926.
T. MIDGLEY
1,603,855
METHOD AND MACHINE FOR MAKING CORD TIRES
Original Filed March 20, 1919    15 Sheets-Sheet 11
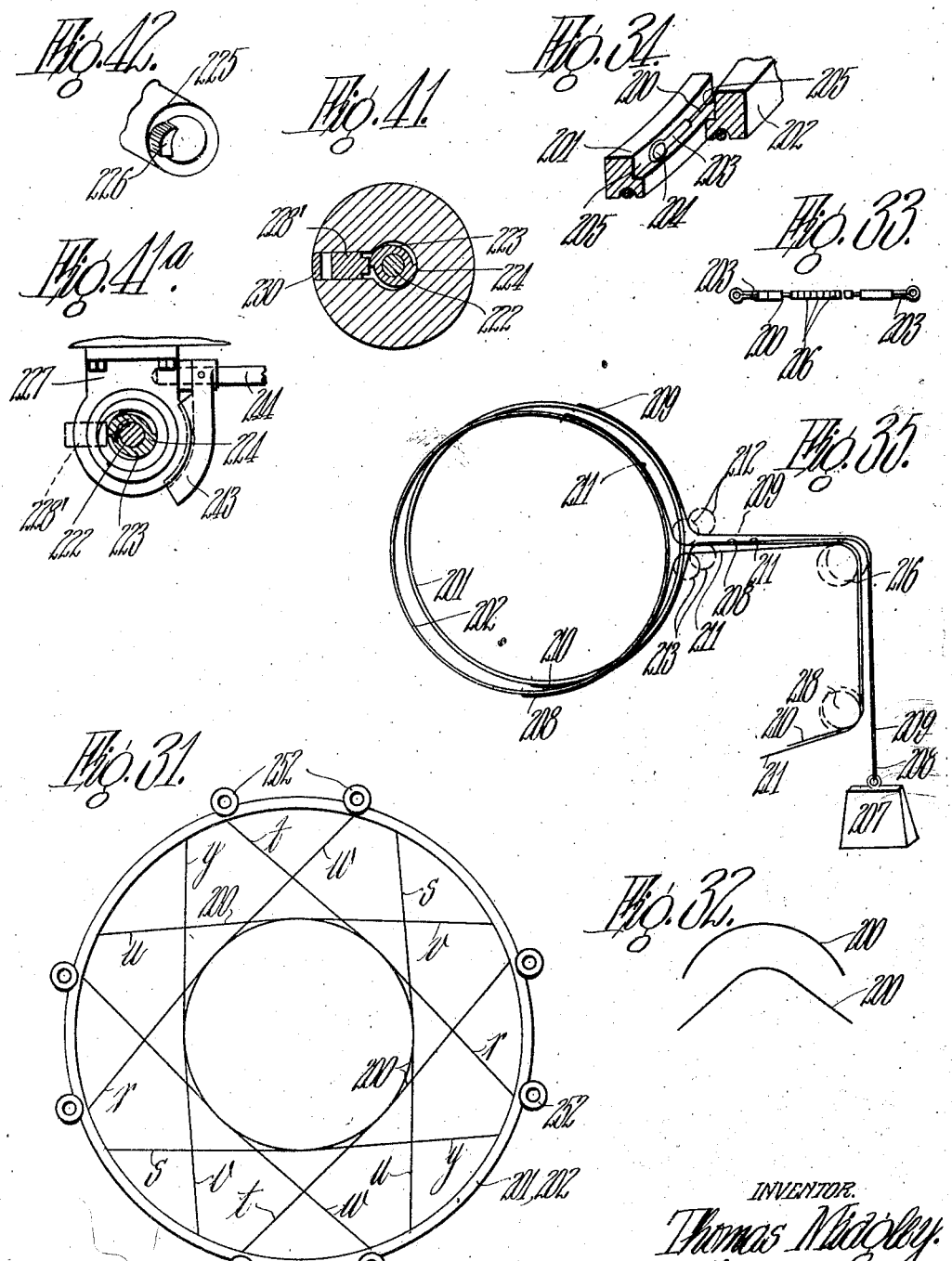

Oct. 19, 1926.
T. MIDGLEY
1,603,855
METHOD AND MACHINE FOR MAKING CORD TIRES
Original Filed March 20, 1919   15 Sheets-Sheet 12
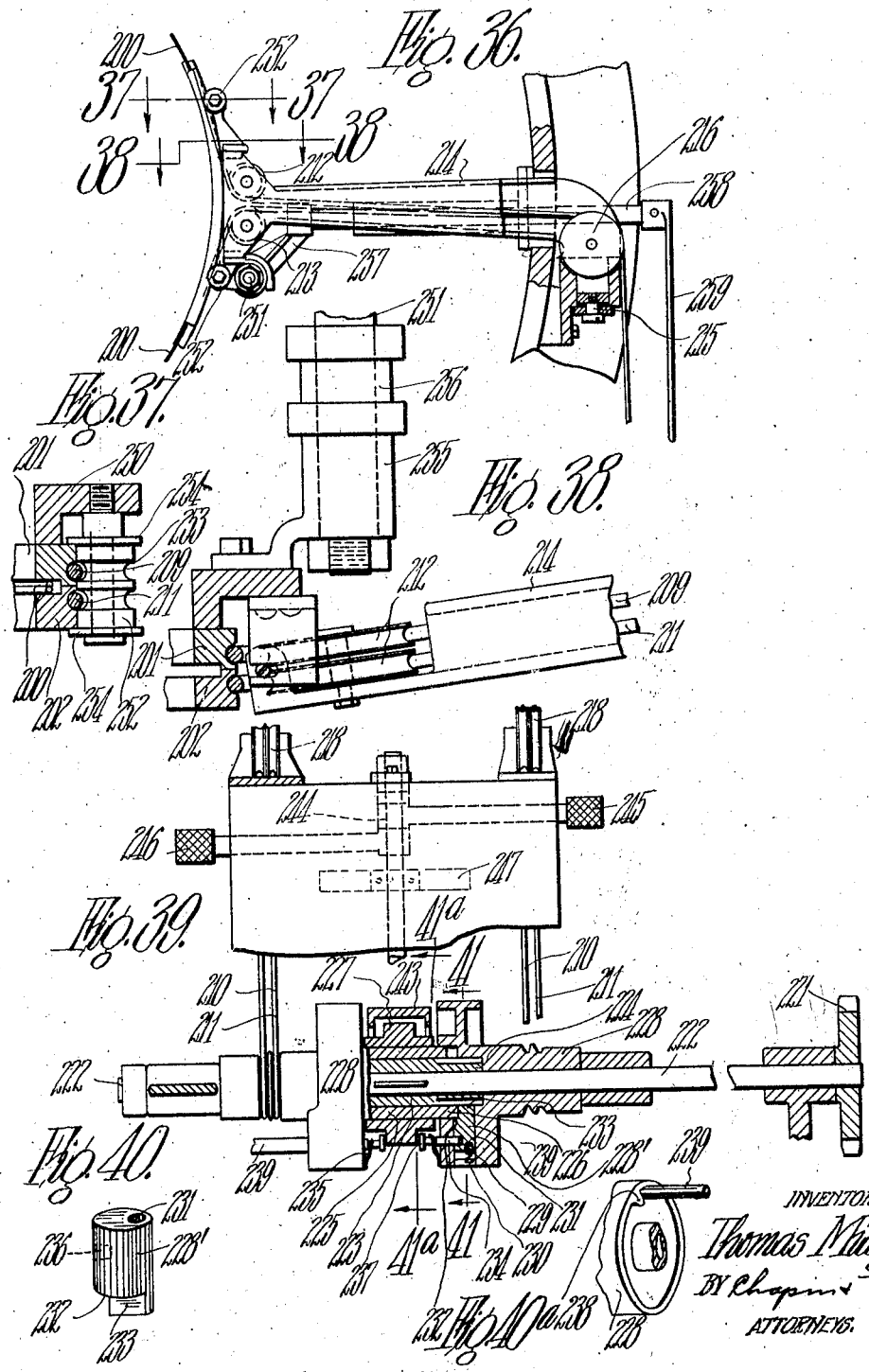

Oct. 19, 1926.
T. MIDGLEY
1,603,855
METHOD AND MACHINE FOR MAKING CORD TIRES
Original Filed March 20, 1919 15 Sheets-Sheet
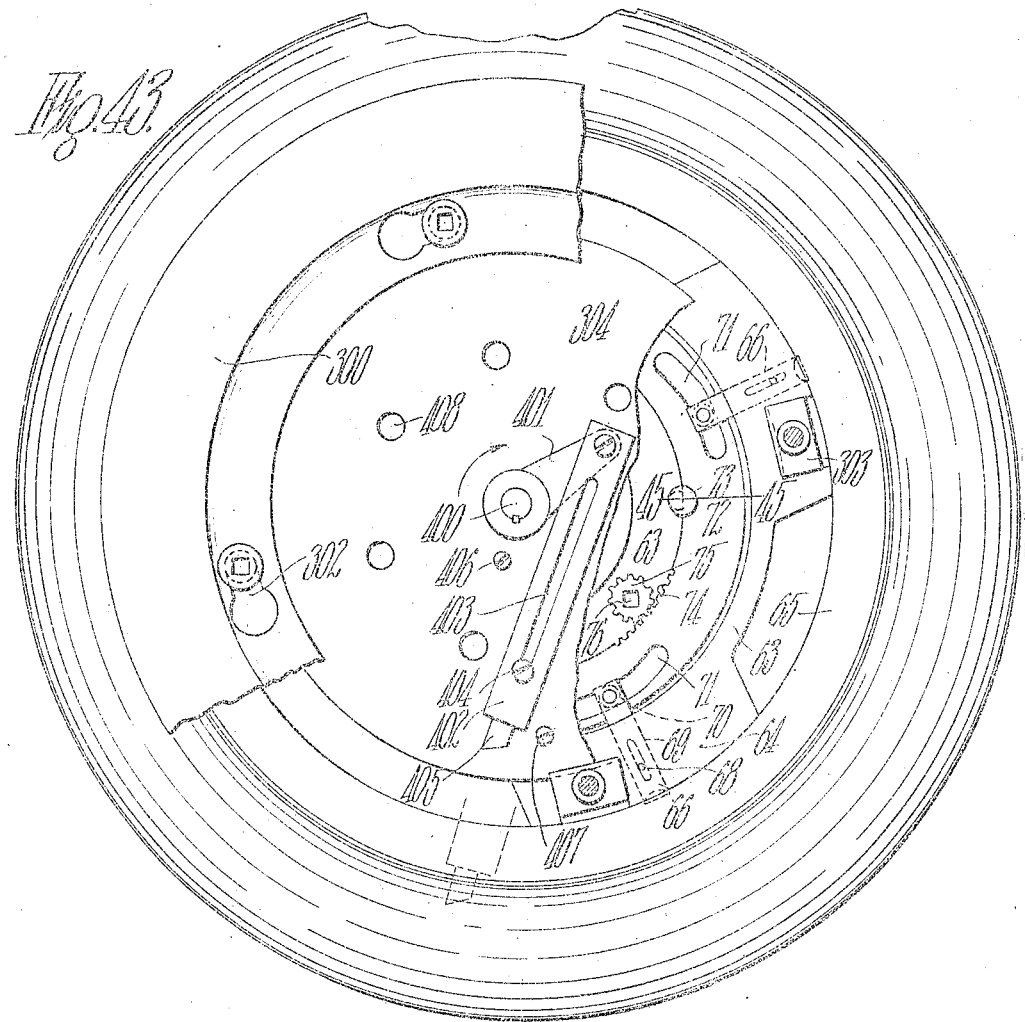
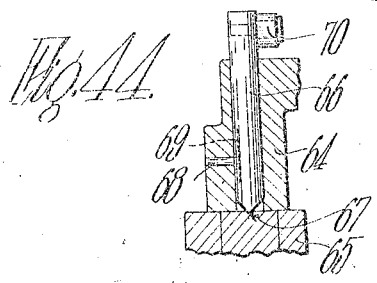
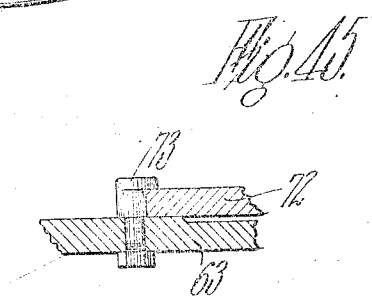
INVENTOR.
Thomas Midgley
BY Chapin + Neal
ATTORNEYS.

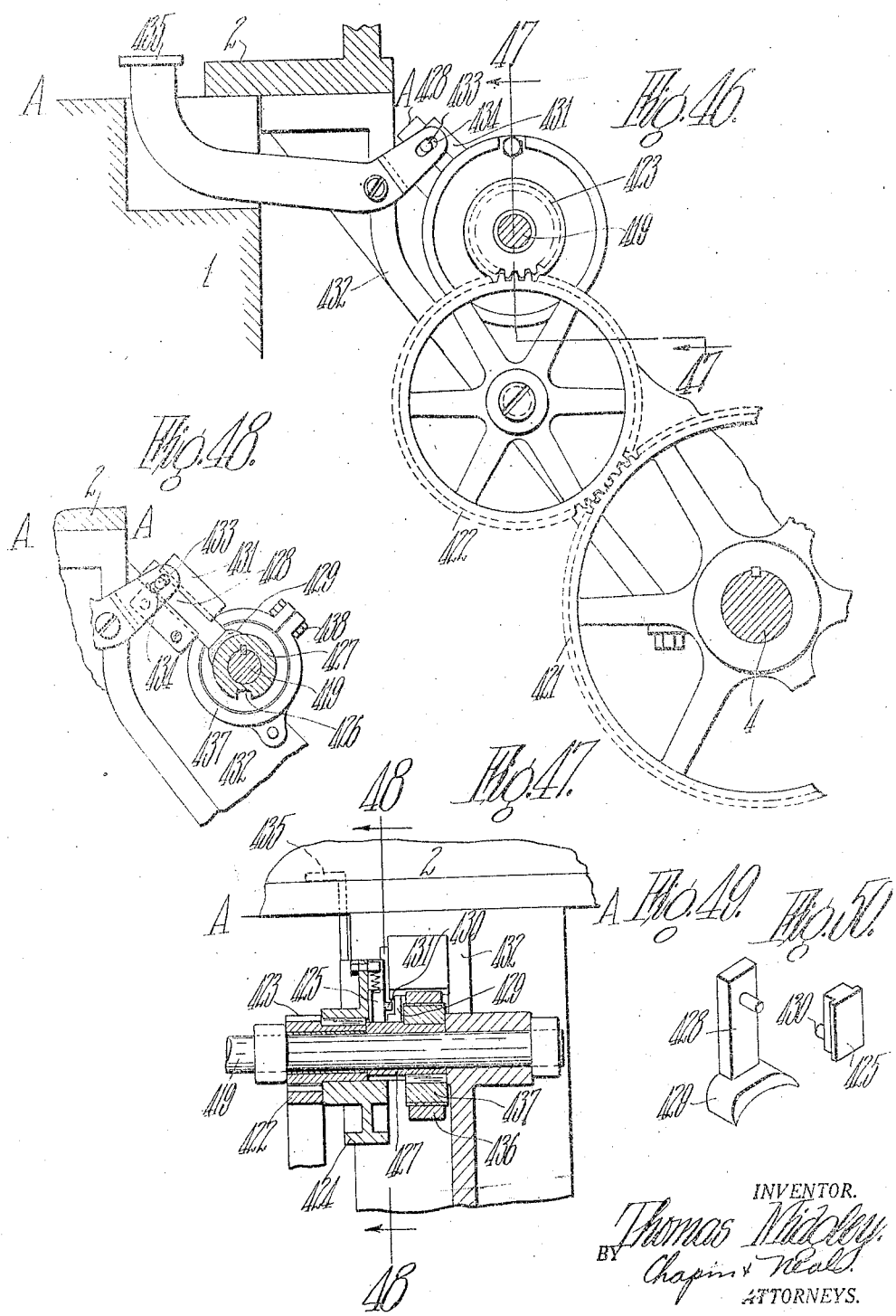

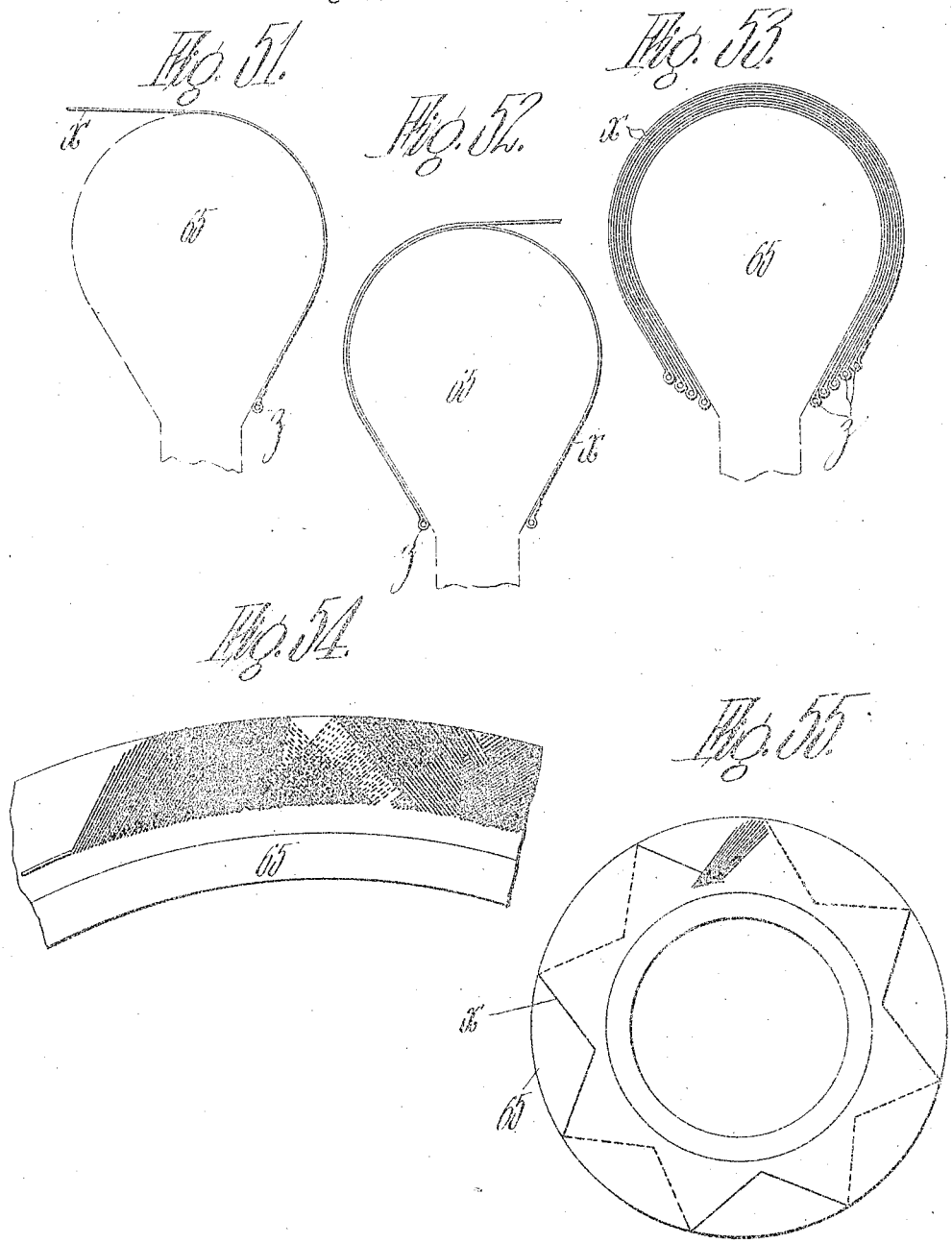

Patented Oct. 19, 1926.

1,603,855

UNITED STATES PATENT OFFICE.

THOMAS MIDGLEY, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

METHOD AND MACHINE FOR MAKING CORD TIRES.

Application filed March 20, 1919, Serial No. 283,279. Renewed August 22, 1924.

My invention relates to methods and machines for making cord tires. Specifically, it relates to a method and a machine for building up the fibrous part of a tire casing out of a plurality of layers of parallel cords, the cords in the several layers being continuations of the cords in the preceding layers, and each layer being preferably composed of a sufficient number of parallel cords to extend completely around the circumference of the casing.

It has for its object to provide a machine for carrying out the method of building cord tires disclosed in my copending application Serial No. 264,960, filed December 2, 1918. It also has for its object the improvement of the method disclosed in said application in various particulars which will appear from the description and claims. It also has for its object the provision of a method and a machine for greatly increasing the speed with which cord tires may be made by machinery and the improvement of the quality of the product.

According to my invention, a plurality of building elements such as parallel cords $x$ or strips containing several cords, preferably extending around the whole circumference of a ring core, of the form usual in tire manufacture, are secured to one side of the core as by an anchoring wire $z$ (Fig. 51). The cords are led over the crown of the core by a reciprocation of the core past the cord feeding mechanism, and a tensioning device draws them tight and holds them in position to receive a second anchoring wire $z$, whereupon the cords are led back over the core (Fig. 52) by a second reciprocation thereof. Relative rotation is provided between the cord feeding means and the core, so that the cords will be laid, not straight across the core, but diagonally. In Fig. 55, the course of one cord is shown as it passes repeatedly across the crown of the core, and in Fig. 54 a similar view is given of a plurality of cords. It should be noted that in practice a sufficient number of parallel cords are drawn over the core at each operation to form one complete layer, and that, in Fig. 55, the single cord shown would find itself in a new layer of cords at each traverse. The machine is provided with beating mechanism to compact the layers at the sides of the tire, and with cutting mechanism to sever the cords after the tire is completed.

The operation of the machine will be described more in detail after the various portions of the mechanism have been gone over in relation to the accompanying drawings, in which—

Fig. 3 is a vertical section through an automatic clutch mechanism;

Fig. 4 is an elevation of a detail of the clutch taken on line 4—4 of Fig. 6;

Fig. 5 is a section taken on line 5—5 of Fig. 7;

Fig. 6 is a section showing the operating means for the automatic clutch;

Fig. 7 is a section on line 7—7 of Fig. 4;

Figs. 8 and 9 are details of the clutch mechanism;

Fig. 10 is a section on line 10—10 of Fig. 1 with the main slide shown in operable engagement with the core slide and with certain parts omitted;

Fig. 11 is a vertical section through the center of the core support shown at the right of Fig. 1 and also through a portion of the core support shown at the left, these supports being shown in the positions they occupy when work on the right-hand core is completed and work on the left-hand core is being commenced;

Fig. 12 shows a modification of the beaters;

Fig. 13 is a development of the surface of the core-turning cam;

Fig. 14 is a detail of the ring support for the cam roll for the core-turning cam;

Fig. 15 is a vertical section on line 15—15 of Fig. 14;

Fig. 16 is a development of the surface of the beater cam;

Fig. 17 is a side elevation of parts shown in Fig. 16;

Fig. 18 is an elevation of one of the cord-feeding units;

Fig. 19 is a section through the cord guide ring;

Fig. 20 is a side elevation of the parts shown in Fig. 19, with some elements shown broken away;

Fig. 21 is a section on line 21—21 of Fig. 18;

Fig. 22 is a side elevation of one of the cord-feeding units, looking from the left of Fig. 18;

Fig. 23 is a section on line 23—23 of Fig. 22;

Fig. 24 is a section on line 24—24 of Fig. 18, with some parts shown broken away;

Fig. 25 is a section on line 25—25 of Fig. 21;

Fig. 26 is a section on line 26—26 of Fig. 25;

Fig. 29 is a plan of the drum and main slide;

Fig. 30 is a diagram showing various positions of the core relative to the cord guide ring;

Fig. 31 is a diagrammatic view of the cord tensioning wires and their supporting rings;

Fig. 32 is a diagram showing the inactive and operative positions of one of the cord tensioning wires;

Fig. 33 is a detail of one of the cord tensioning wires;

Fig. 34 is a fragmentary view of the rings showing the attachment of the tensioning wires thereto;

Fig. 35 is a diagrammatic view of the operating cables for the rings;

Fig. 36 is a detail showing the mechanism for causing sideways movement of the rings;

Fig. 37 is a section on line 37—37 of Fig. 36;

Fig. 38 is a section on line 38—38 of Fig. 36;

Fig. 39 is a plan view, partly in section, of the operating mechanism for the tensioning rings, taken on line 39—39 of Fig. 2;

Fig. 40 is a detail of a driving dog shown in Fig. 39;

Fig. 41 is a detail of mechanism shown in Fig. 39;

Figure 1:
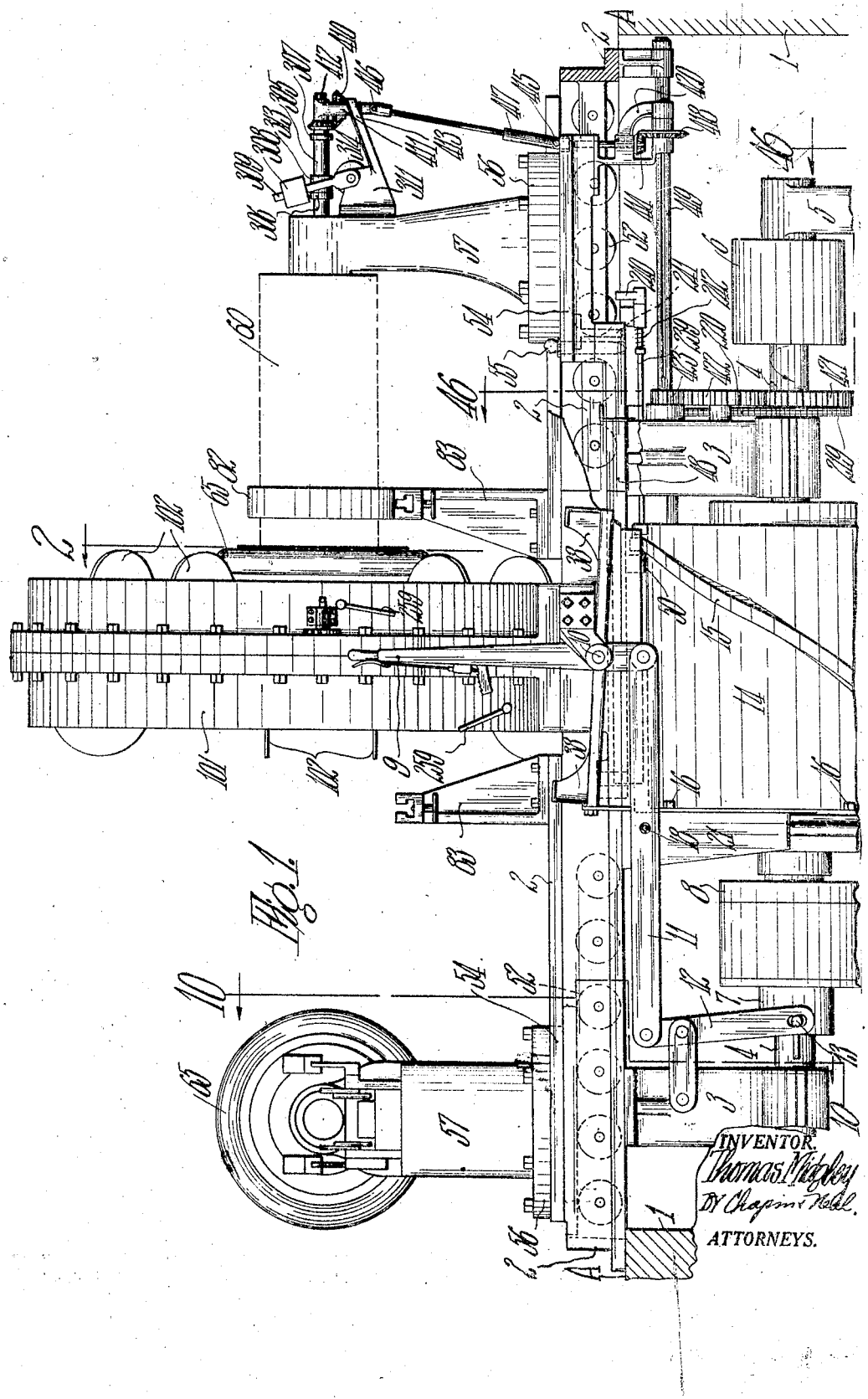
Fig. 1 is a side elevation of the complete machine with some parts shown broken away.

Fig. 41ᵃ is a section on line 41—41 of Fig. 39;

Fig. 41ᵇ is a section on line 41ᵇ—41ᵇ of Fig. 39;

Fig. 42 is a detail of the cam sleeve shown in Fig. 39;

Fig. 43 is an end view of the core support shown at the right of Fig. 1 with certain parts shown broken away;

Fig. 44 is a sectional detail of one of the core-locking pins;

Fig. 45 is a section on line 45—45 of Fig. 43;

Fig. 46 is a section on line 46—46 of Fig. 1;

Fig. 47 is a section on line 47—47 of Fig. 46;

Fig. 48 is a section on line 48—48 of Fig. 47;

Figs. 49 and 50 are details of parts shown in Figs. 47 and 48;

Figs. 51, 52, and 53 are diagrams showing various stages in the building of the tire;

Fig. 54 is a diagram showing the disposition of the cord layers on the core; and Fig. 55 is a diagram showing the path of one cord around the core.

Main frame.

Figure 2:
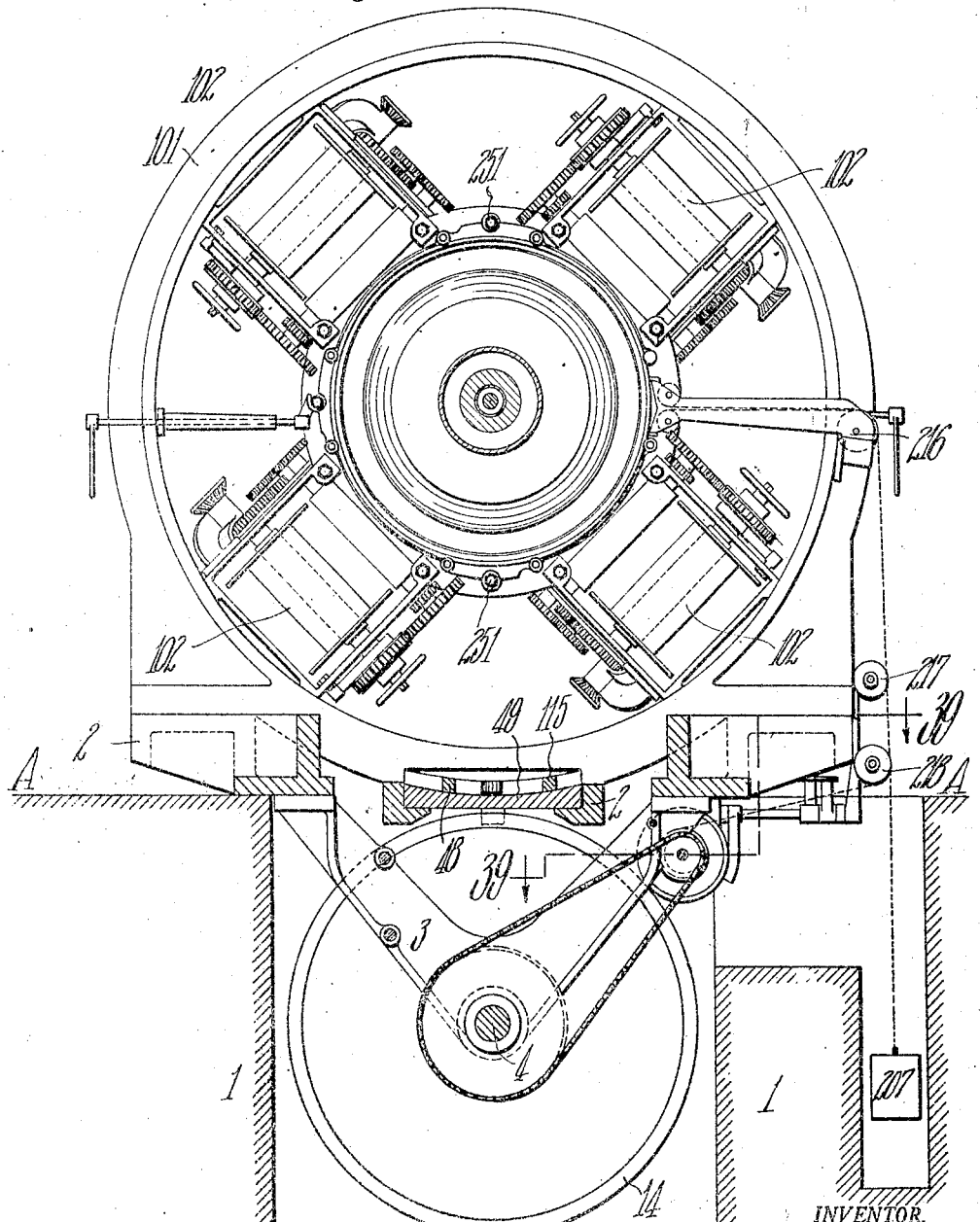
Fig. 2 is a section on line 2—2 of Fig. 1.
Figure 27:
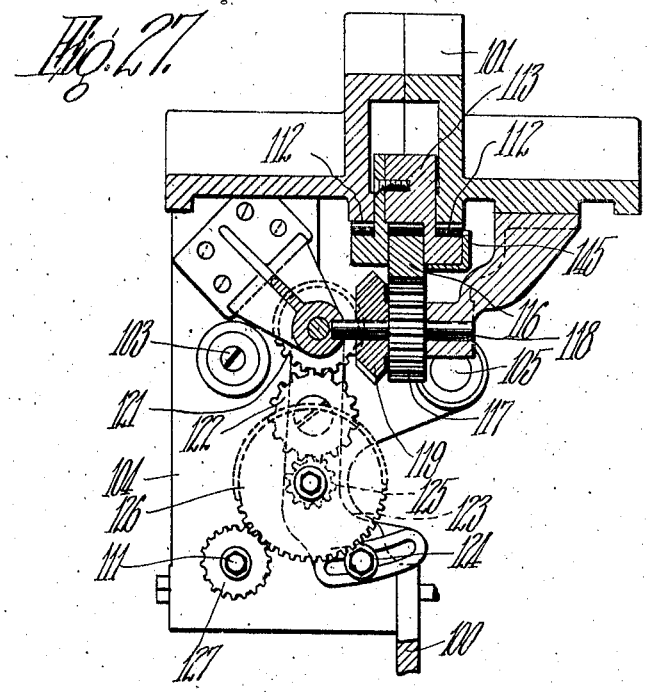
Fig. 27 is a section on line 27—27 of Fig. 18.
Figure 28:
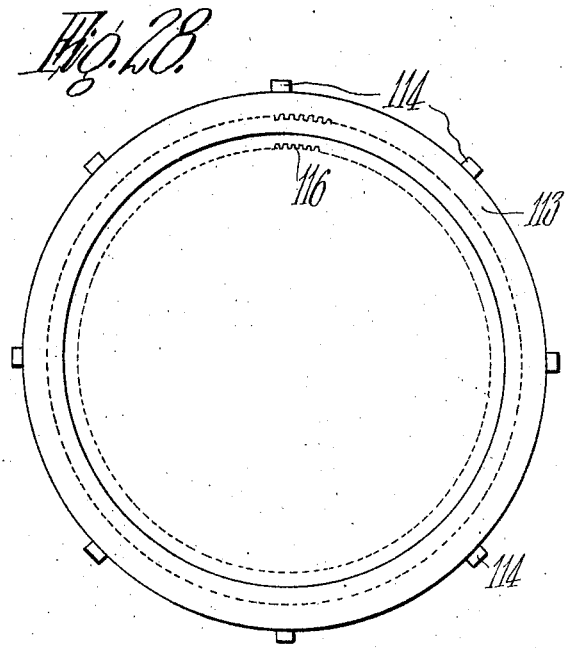
Fig. 28 is a diagrammatic view of the ring gear for driving the cord-feeding units.

The machine is mounted on a heavy foundation 1, preferably of oak or concrete, and a large part of the mechanism, including the main drive and various clutches and cams, is sunk in a pit. The floor level is indicated as line A—A in Figs. 1, 2, and 10. Supported on this foundation is a frame 2, from which depend brackets 3 for supporting the main shaft 4 and the mechanism attached thereto. The main shaft 4 is also supported by a bracket 5 hung from the foundation.

Main drive and hand clutch (Figs. 1, 6, and 20).

The main shaft 4 carries near one end a drive pulley 6, to which power is furnished from any suitable source, and near the other end is keyed the slidable member 7 of a friction clutch, the other member 8 of which turns freely upon the shaft 4. This clutch is operated by a handle 9, pivoted at 10 to a bracket on frame 2, and carrying below the pivot a link 11 which at its other end is pivoted to a lever 12 coupled at its lower end, through a pin and slot joint 13, to the slidable part 7 of the friction clutch.

Also mounted to rotate freely on the main shaft 4 is a large drum 14, carrying on its periphery a cam 15 for a purpose to be later described. At various convenient points around one edge of the drum are arranged lugs 16 (Figs. 3 and 20). These lugs are arranged to contact with a slidable stop 17, which is projected into their path by suitable connecting mechanism when lever 9 is operated to disengage the friction clutch 7, 8, so that the machine will stop at any one of a number of predetermined points. These points will generally be chosen to correspond with the positions of the traveling core, diagrammatically illustrated in Fig. 30, and more fully described later. The means herein shown for operating the stop 17 include a rod 18 secured to link 11 and drilled at its free end to receive the rear end of stop 17, which is yieldingly held in position by spring 19 and lock nuts 20. The shank of stop 17 receives its bearing in a bracket 21 secured to frame 2 and forming bearings and guides for various parts hereinafter mentioned.

*Automatic clutch (Figs. 1, 3, 4, 5, 6, 7, 8, and 9).*

In addition to the manually operated clutch above described, whereby the machine may be stopped at will at various points, an automatic mechanism is provided by means of which the machine, when started by a treadle, will run through one-half a cycle (see Fig. 30 and general description of operation of the machine), and then stop, remaining at a standstill until again started by the treadle. This mechanism will now be described.

Keyed to part 8 of the friction clutch, as by a feather 22, is a small hubbed disk 23. The periphery of this disk is provided with a shouldered or cut-out portion 24, interrupted at intervals by a number of small plates 25, sunk into the higher part of the periphery of disk 23. Disk 23 is held away from the web of drum 14 by a spacing collar 26, which holds the parts in their proper positions.

Mounted on drum 14, and serving as driving means therefor, is a hub 28, provided with a circumferential groove 29, and with one axial groove 30. In the latter groove is dovetailed, so as to slide freely, a clutch bar 31, shown in perspective in Fig. 9. At one end of this bar is a small lug 32, serving as a positioning means for a spring 33, the other end of which is secured to a plate 34 attached to the web of drum 14. In one face of the clutch bar 31 is a slot 35, one edge of which is straight, while the other edge has a cam part 36 and a short straight part 37. The clutch bar is normally pressed by the spring into the position shown in Fig. 4, when its outer end is engaged by one of the plates 25 on the hubbed disk 23. With the parts in this position, drum 14 will be driven through the above-named parts from part 8 of the friction clutch. Clutch bar 31 is withdrawn from this driving position by the mechanism about to be described.

Pivoted at 10 to the frame 2 (Figs. 1 and 6) is a rocking double treadle 38. Depending from one side of this rocking treadle is a bar 39, pivoted at its lower end to one arm of a bell crank 40, the other arm of which is pivoted at 41 to a rocking yoke 42. Bell crank 40 and yoke 42 are pivoted to bracket 21 at 43 and 44, respectively.

On each of its ends, yoke 42 carries a pin 43′, which operates in a slot 44′ in the outer end of a slide 45 mounted in bearings formed in bracket 21. The inner end of slide 45 is formed into a triangular cam 46 which, when the slide is forced inwardly, lies in slot 29 directly in the path of the cam portion 36 of clutch bar 31. Slides 45 are in duplicate, one being operated by each arm of the yoke 42, as clearly shown in Fig. 6.

Assuming now that the treadle 38 is in the position shown in Fig. 1, bar 39 is in its highest position, the yoke 42 will be swung to the left in the view of the parts taken in Fig. 6, and slide 45 at right of the latter figure will have its cam portion 46 projected into slot 29, while the other slide 45 will be withdrawn from the slot. Now when the clutch bar 31, which is in engagement with plate 25, as shown in Fig. 4, reaches that cam 46 which is projected into slot 29, the cam portion 36 of the clutch bar slot will ride up on the cam 46, withdrawing the clutch bar from engagement with plate 25. When the disengagement is complete, the flat portion 37 of the clutch bar slot will have reached the flat portion 47 of the slide 45. With the parts in this position, disk 23 will continue to rotate, but, as the clutch bar is not in engagement with any of the plates 25, the hub 28, and consequently drum 14, will remain stationary. This condition will be maintained until the operator pushes down the other side of the treadle, thereby rocking the yoke 42 to the right in the view taken in Fig. 6, withdrawing the slide 45 at the right of the figure, and pushing in the slide at the left. Clutch bar 31 is thus released and snaps back into the position of Fig. 4, being engaged by the plate 25 which is next to come by. Drum 14 is rotated by this means until the clutch bar is again cammed out of engagement with plate 25 by the other slide 45. It will be seen that, on the operator depressing the treadle 38, the drum 14 will be rotated through half a revolution, and will then automatically stop, remaining at rest until the operator again sets it in motion through the treadle. The purpose of this interrupted motion will be explained later in connection with the general operation of the machine, but it may be stated here that the automatic stoppage of the machine occurs at points in the travel of the core corresponding to position b and e in Fig. 30.

*Core supporting mechanism (Figs. 1, 2, 10, 11, 13, 14, 15, 29, 43, 44, and 45).*

Mounted to reciprocate in guides in the main frame 2 is a main slide 48, having a concave upper portion 49, on which are mounted cams for purposes which will be described in connection with the cord-supplying mechanism. The main slide is provided with a depending cam roll 50, engaged by cam 15 on drum 14. This cam has two opposite flat portions 51, which bring the carriage to a stop just as the drum itself is stopped by the automatic clutch described above (see Fig. 29). Slidable on rollers 52, which are held in place by the main frame and a bearing strip 53, are two core-supporting slides 54, one at each end of the machine. These slides are brought into operation successively, a tire being built up on one core and the cords then transferred to the other in a manner to be described. The slides and mechanism carried thereby are identical, except that one carries a cutting mechanism while the other does not. With the exception of the cutting mechanism, which will be described later, the description to be given of one will suffice for both.

The core-supporting slides 54 are coupled and uncoupled from the main slide in any suitable manner, as by dowel pins 55. To the slide is secured a cap 56, retaining in place, by means of ball bearings, a pedestal 57, which is thus free, except when otherwise confined, to rotate about a vertical axis. Rigidly attached to this pedestal, as by a pin 58, is a long hollow shaft 59. Free to rotate about this shaft is a cam drum 60, supported on spiders 61 having bearing on the shaft 59, and being confined against axial motion by pedestal 57 on one side and a collar 62 on the other. Another spider, 63, secured to the cam drum 60 and with bearing on the shaft 59, has projections 64, three as illustrated, which support the inner surface of a ring core 65 on which the tire is to be built up.

The ring core slips snugly over the projections 64, and is held firmly in place by pins 66 having wedge-shaped outer ends which enter a groove 67 in the inner surface of the ring core (see also Fig. 12). These pins slide freely in bearings in projections 64, being guided therein by pins 68 whose ends project into grooves 69 in the pins 66. At the inner end of pins 66 are cam rolls 70, running in cam grooves 71 in an annular plate 72 which rotates in bearings formed by cleats 73 bolted to the spider 63. The inner circumference of the annular plate is provided for a short distance with gear teeth 74 meshing with a pinion 75 pivoted to the spider 63 and having in its outer surface a square depression 76 to fit a wrench by which the plate may be rotated. It will be seen that the ring cores are detachably mounted on the spiders 63, and that they can be removed therefrom by rotating pinion 75 with a wrench, which will rotate plate 72 and draw pins 66 inwardly.

In order to rotate the core so that the cords may be laid on at an angle, as shown in Figs. 18, 54, and 55, cam drum 60 is provided with a cam groove 77 formed, as shown, between projecting tracks 78 and 79. Running in this groove is a cam roll 80 pivoted, as by a bolt 81, to a ring 82 completely encircling the cam drum. This ring is detachably held on a standard 83, attached to the main frame, by a dovetailed lug 84, fitting a corresponding groove in the standard. The lug is clamped in position, thereby holding the ring rigid, by a hand screw 85 having a pointed end 86 entering a conical depression in the lug.

As shown in the development of the surface of the cam shown in Fig. 13, the tracks 78 and 79 are arranged in parallel V's, the apices of which are alternately at one side and the other of the centerline of the cam. A gap is left at each apex, and pivoted to track 79 adjacent each gap is a switch 87 having a rearwardly extending arm 88 to which is attached one end of a tension spring 89, the other end of which is fastened to a pin 90 on the cam drum. By this means, the switch is yieldingly held closed. As the cam drum is reciprocated, because of its attachment to slide 48, roller 80, held stationary on standard 83, will cause the cam drum to rotate first in one direction and then in the other, with brief periods of rest as the roller passes over the flat surface 91 of the switches. In Fig. 13, the roller is shown in different positions corresponding to the positions of the core in Fig. 30, but it will be understood that the roller remains stationary while the cam drum has a motion both of reciprocation and rotation relative to it, and that this showing is merely for the sake of clearness and convenience.

Tracing out the path of the roller relative to the cam as shown by the arrows in Fig. 13, the roller is first in position $a$; then, as the cam drum is reciprocated, it passes along track 77 over the flat surface of one switch and under a second, forcing the latter out of the way against the tension of its spring 89 as it passes. Having reached position $d$, the direction of reciprocation of the cam drum is reversed, and the roller retraces its path relative to the cam drum, along track 77 and over the flat surface of the second switch just referred to and up the track 77 on the other side of the V. It will be clear, from a study of the cam, that, while the cam drum is reciprocated, it has impressed upon it a rotative movement, first in one direction, then in the other, then again in the first; but that the rotative movement in one direction is in its summation greater than the movement in the other. Expressed somewhat differently, the cam drum has a rotation in one direction, that rotation being accomplished by successive advances and retrogressions, the advances being always greater in amount than the retrogressions.

*Cord feeding mechanism (Figs. 1, 2, 18 to 30, and 51 to 55).*

As will be seen from Figs. 30 and 51 to 55, the tire is built up by laying a plurality of parallel cords $x$ diagonally across the outside of the core 65; first in one direction and then in the other, until the desired number of layers has been produced. Referring particularly to Fig. 30, the cords are led out of a guide 100, and, as the core is reciprocated back and forth, the cords are drawn across it, being laid at an angle on account of the rotative movement of the core described above. The several layers are tensioned by means to be described and are held in position by rings z, as will fully appear later.

The cords are furnished to guide 100 from a plurality of feeding units, supported on a large annular member 101. As shown, there are eight of these units, mounted in staggered relation, four being on each side of the center of member 101. Fig. 18 shows one of these units and a portion of the adjacent one, which is mounted on the further side of member 101. Each unit has a reel 102, on which the cords are wound, which is mounted on a shaft 103 extending between the arms of a bracket 104, attached to the annular member. The cords are led from the reel over an idler 105 and between positively driven rolls 106 and 107, passing from roll 107 to the guide 100. Roll 106 is spring-pressed against roll 107 by a spring 108, acting on a bell crank 109 pivoted to bracket 104 at 110, and carrying the shaft of roll 106.

Rolls 106 and 107 are driven by the following mechanism. Mounted on roller bearings 112 in member 101 is a ring structure 113, carrying on its outer circumference a plurality of cam rolls 114 which coacts with cam ribs 115 on the concave portion 49 of slide 48. As the slide is reciprocated, one cam roll after another will be engaged by the ribs, as is shown by the arrows in Fig. 29. These arrows denote the path of the cam rolls 114 relative to the cam, it being understood that the rolls always remain in a single plane, shown as the line K—K in that figure. The cam roll shown in the figure follows the path relative to the roll indicated by the arrows $m'$, $m^2$, and $m^3$. This roll then travels out of the range of the cam, and the next succeeding roll is engaged, taking the path denoted by arrows $n'$, $n^2$, $n^3$, and $n^4$, and finally going over the path $m'$, $m^2$, and $m^3$ taken by the first roll. The ring 113 thus has a general advancing motion broken up into successive advances and retrogressions, quite similar to that given to the core 65 through cam drum 60.

Releasably mounted in ring 113 by means to be described is an annular internal gear 116, which, in the normal operation of the machine, partakes of the peculiar motion of ring 113, and drives a gear 117 on a shaft 118 which also carries a bevel gear 119. This bevel gear meshes with a similar one 120 on the shaft of a small gear 121, meshing with another gear 122, which is carried on a swinging arm 123 pivoted about the shaft of gears 120 and 121, and being clamped in position by a bolt and slot connection 124. Also carried on arm 123 is a shaft carrying a pinion 125 and a detachable gear 126. This forms an arrangement similar to the sweep on the headstock of a lathe, whereby the speed of the cord-feeding rolls may be varied by changing gear 126 to suit the width of tire being manufactured. Gear 126 meshes with a pinion 127 mounted on the end of shaft 111 of roller 107. On the other end of this shaft are gears 128 and 129 of which the former drives the spring-pressed roll 106 through a pinion 130 on the shaft of the latter.

When the cord is being unwound from the reel 102, the latter is not connected to any of the above gearing, being free to turn except for the action of a friction brake 131 pressing on a drum 132 on a hub 133 fast to shaft 103. During certain periods in the operation, however, it is necessary to rewind some of the cord onto the reel, as will appear more in detail later; and during these periods rolls 106 and 107 are driven in a reverse direction by the retrograde movement of gear 116 referred to above, and the reel itself is driven in a direction to wind up the cords upon it. This is accomplished by a clutch and friction drive constructed as follows. Fixed against rotation on shaft 103 are two spaced hubs 133 and 134, and between them, although separated by friction washers 135, is a disk 136 having its outer periphery formed with ratchet-shaped teeth 137. Surrounding this disk and held in position by rings 138 is an annular gear 139, separated from the disk by rollers 140 located in the recesses between the teeth 137. By this means, which is a common type of clutch, as gear 139 is rotated clockwise as viewed in Fig. 24, the rollers will bind against the slanting side of the teeth, and disk 136 will be rotated, but, if gear 139 is rotated in the reverse direction, the rollers will ride in the deeper part of the recesses, and the disk will not be turned. To provide for the different pulling effect on the cords as the quantity of material on reels 102 varies, gears 129 and 139 are of such size that, with the minimum of material, on the reel, the speed with which the cords are drawn by the reel will be the same as the speed with which they are fed by rolls 106 and 107; and, with greater amounts of material on the reel, slippage is provided between hubs 133 and 134 and the disk 136 by washers 135. A hand-wheel 141 is provided by which the pressure on these washers may be varied. In case it is desired to take up the slack between roll 106 and the reel manually, this may be done by applying a wrench to the squared end 142 of shaft 103.

It is sometimes convenient to be able to operate the cord-feed either to wind up or deliver cord independently of the remainder of the machine. As previously mentioned, gear 116 is releasably mounted in ring 113 and, when released, may be rotated by turning the squared shaft of pinion 148, mounted for continuous engagement with the gear. The mechanism for thus releasably connecting gear 116 to ring 113 is as follows. Carried on ring 113 by a bolt and slot connection 144 to allow for a limited rotative movement relative thereto is a gear 145 having an L-shaped portion extending under the ring. At intervals around the ring are clamps 146, slidable toward and away from gear 116 in slots in the ring, and adapted to be forced against that gear by a wedge 147, carried by a plate 148 on gear 145. It will be seen that, as gear 145 is rotated relative to the ring, clamps 146 will be moved to clamp or release gear 116, depending on the direction of rotation. The rotation of gear 145 is accomplished by a pinion 149 mounted on a shaft 150, both slidable and rotatable in a bearing 151 on support 101, and provided with a handle 152. Normally, this pinion is out of engagement with the gear, but, when it is desired to release the cord-feeding mechanism, the pinion is pushed into mesh with the gear and rotated, freeing clamp 146 from the action of wedge 147, and releasing the gear 116 for operation through pinion 148.

Guide 100, which delivers the cords from roll 107 to the core on which the tire is built up, is preferably constructed as follows (Figs. 18 and 29). The body of the guide is an annulus with its sides sloping towards the inner circumference. Along the sides, in a radial direction are alternate ribs 188 and grooves 104. Through the grooves the cords coming from roll 107 are led, and are guided, to reduce friction, by rollers 105 separated by spacing rings 106 and held in position by annular plates 107 bolted to the side of the guide. To still further reduce friction, these rollers may be supported on balls 105 running in pockets in the plates. The rollers are made in short lengths, one end of each being spherical and the other end having a spherical depression, so that they may be arranged in large concentric circles, as shown in Fig. 30, without leaving any break between adjacent rolls. The cords from one cord-feeding unit are all led down one side of the guide, while the cords from adjacent units pass through the other side. Thus, the cords to the left of point p (Fig. 18) all pass through the grooves on the front of the guide, while those few shown on the right are a portion of those coming from the feeding unit on the right, and pass through the grooves on the back of the guide.

*Tensioning mechanism (Figs. 1, 2, and 30 to 42).*

After the core has drawn over itself one layer of cords from guide 100 by its reciprocation under the guide, it is necessary to tighten the cords around the core and then hold the layer firmly in position by securing an anchoring wire s in place. Referring for a moment to Fig. 30, the first ring c is applied (see also Fig. 31) while the core is approximately under the guide 100, and the core is then reciprocated to point a, drawing the cords over approximately half of the core surface. Just before this position is reached, the tensioning means is tripped and a plurality of wires 200, functioning somewhat like an iris diaphragm, are applied to the cords under the influence of weights, and draw the cords down to the lower position shown at b, Fig. 30, as the core reaches that position, and at which point the machine remains stationary until the operator has finished securing the second anchoring wire s in place and again starts the machine.

The wires 200 are shown in Fig. 31 as drawn inwardly to a position also shown at b of Fig. 30; and in Fig. 32 one of the wires is shown in both this position and its inoperative position. The several wires, denoted in Fig. 31 by letters r, s, t, u, v, w, and q to make clear the manner of their connection, are each attached at one end to a ring 201 and at the other to a ring 202. This attachment may be made by an eye 203 soldered to the wire and a screw 204 passing through the eye and into the ring. The rings are rotated by mechanism to be described, in opposite directions thus separating the ends of the wires and drawing them from the upper to the lower position in Fig. 32. When in their expanded position the wires lie in recesses 205 of the rings 201 and 202, as seen in Fig. 32, so that they are completely protected and out of the way when not in use. In order to reduce as much as possible the friction of the tensioning wires on the cords w and to allow the wires freedom to adjust themselves under the tension, the wires are surrounded by short lengths of small tubing 206 (Fig. 35). The terminal lengths of this tubing are secured to the wires in any way, preferably by soldering, so as to leave those lengths in the middle free to rotate but not to slide along the wire.

The rings are rotated by weights 207 (Figs. 2 and 35), one for each ring, and connected to the rings by cords 208 and 209 respectively. The tension put on the wires is determined only by these weights, and hence can be varied by merely adding or subtracting from the weights. Another pair of cords, 210 and 211, serve to hold the rings and wires in inactive position and to return them to that position after the tensioning operation is finished. The cords are guided by rollers 212 and 213 mounted adjacent the ring on an arm 214, which is pivoted to swing about a swivel 215 for a purpose to be described, and then pass over guide rollers 216, 217, and 218.

The weights are released to draw the wires into their closed positions by a clutch mechanism which will now be described. On shaft 4 is a sprocket 219, carrying a chain 220 also passing over a sprocket 221 on a short shaft 222. Keyed to this shaft is a member 223, each end of which is formed into a double clutch 224. A cam sleeve 225, having a cam 226 on each end, is firmly held in a position surrounding member 223 by a bracket 227. Rotating freely on shaft 222, member 223, and cam sleeve 225 is a clutch hub 228, there being one hub on each side of bracket 227. This hub has a radial aperture in which runs a dog 228'. The dog is pressed inwardly by a spring 229 abutting against a cap 230 set into the aperture referred to and seating in a hole 231 in the dog. The inner end of the dog is formed with a shoulder 232 coacting with cam 226, and with a projection 233 adapted to be engaged under certain conditions by clutch 224. The dog is normally held in its outer or inoperative position by a pin 234 pressed by a spring 235 into a recess 236 in the dog, and having a head 237 on its outer end by which it is moved by certain releasing mechanism.

Each hub 228 has an annular recess in which is located a lug 238 (Fig. 40ᵃ) adapted for engagement with a rod 239 carrying on its end an abutment 240 which is in the path of a T-shaped lug 241 on slide 54. As the slide approaches the outward limit of its motion, lug 241 engages abutment 240 and carries rod 239 outwardly against the tension of spring 242, thus withdrawing the end of the rod from engagement with lug 238. Around hub 228 are fastened cords 210 and 211; and, as the rod 239 passes out of contact with lug 238, weights 207, acting through the medium of rings 201 and 202 and cords 210 and 211, will cause the hub to be rotated until the wires 200 have come snugly up against cords *x*. It will be understood that hub 228 is entirely free from any constraint, and that the limit of motion is determined solely by the slack in cords *x* which is taken up. The size of the parts is so arranged, however, that the hub will travel approximately one-half a revolution, bringing head 237 of pin 234 under the influence of a channel-shaped shipper 243. This shipper is carried on a shaft 244 which is adapted to be rocked in either direction by foot levers 245 and 246. Fast on shaft 244 is a flat spring 247 which bears on the bottom of the machine frame and serves to return shaft 244 to its normal position after the operator has removed his foot from the lever.

Shipper 243 pulls pin 234 out of recess 236 of the dog and allows the latter to snap inwardly into the path of one of the shoulders of clutch 224, which is constantly rotating with shaft 222. The dog and shaft then travel together approximately half a revolution, or into the position shown in Fig. 39. At this point, shoulder 232 of the dog rides up on the stationary cam 226, withdrawing projection 233 of the dog from engagement with the rotating clutch 224; and, at the same time, rod 239 rides over the slanting side of lug 238 and snaps into position against the straight side to hold the hub from being rotated in the reverse direction by cords 210 and 211.

Rings 201 and 202, and the connecting parts down to the hubs 228, are in duplicate, being located in Fig. 1 inside the annular support 101, one being at either side of the center thereof. As the cords *x* are tensioned, as described, by one of the tensioning mechanisms, an anchoring ring *z* is fastened in place; and (Fig. 30) the core is reciprocated from position *b* through *c* and *d* to *e*, where it comes under the influence of the other tensioning mechanism, acting upon the other side of the core.

When the work on one core has been finished, and the cords are to be transferred to the other core, it is necessary to have the rings in a different position from that normally occupied. This is accomplished by mounting them on a support slidable axially, and movable by hand to the position desired. The rings are each carried in an annular support 250, one for each tensioning unit, slidable on rods 251, and are allowed free rotation within this support by rollers 252, having grooves 253 to permit free passage of the cords 208, 209, 210, and 211 and flanges 254 to keep the rings in their proper location (Fig. 37). Provided for each tensioning unit is a collar 255, attached to support 250 and having a groove 256 for engagement with a shipper 257 mounted on an oscillating shaft 258, which has a handle 259 at its outer end. By swinging this handle, the rings controlled thereby are moved as desired, the arm 214 and the cords following the movement of the rings because of the swivel attachment 215.

*Beating mechanism (Figs. 10, 11, 12, 16, 17, and 43).*

After the anchoring wire *z* has been secured in place in position *b*, Fig. 30, and, while the core is traveling from this point to position *d*, it is desirable to beat or compact the layers of cord adjacent the bead of the casing, to insure that the successive layers and the anchoring wire have been well forced together. This operation is begun at approximately point *c*; and the beater, after having given one sharp blow to the bead, remains in place while the core is traveling from *c* to *d* and thence to *e*, and also while the next anchoring wire is being secured at e.

The beaters 300 are annular plate-like members formed with a hammer portion 301 shaped to conform to the bead of the tire. They are mounted by a slot connection 302 on slides 303 carried on spiders 63. The slides are connected by a disc 304, which is free to rotate relative to the slides, to a sleeve 305 extending through the cam drum 60 and having fast thereto collars 306 and 307.

The sleeve is reciprocated back and forth by a weight 308 adjustable on an arm 309 pivoted on a shaft 310 carried by a bracket 311 on pedestal 57. To arm 309 is pivoted a yoke 312, running in a slot in a ring 313 slidable on sleeve 305 between collars 306 and 307. If the weight is moved, either by hand or by mechanism to be described, past a vertical position to the left in Fig. 11, it will gain speed and momentum because of its own weight and will give the sleeve, through collar 306, a sharp push to the left and will cause that beater head 301, shown at the right in Fig. 11, to give the side of the unfinished casing on core 65 a smart blow. It will be understood that the two cores are shown in Fig. 11 in the position in which the work on one core is finished, and work on the other is to begin, and that, as, in the normal operation, one core is swung as shown in Fig. 1, no opposition will be offered the action of the beaters by the other core, as would appear from Fig. 11. A similar action through collar 307 will occur when the weight is swung in the opposite direction, causing a beating action against the other side of the tire casing.

The mechanism for swinging the weight 308 past its center will now be described. On shaft 310 is a collar 314 having a notch 315 and two pins 316 and 317, the latter projecting in the path of a dog 318 on a slide 319. Arm 309 is releasably connected to the collar 314 by a removable pin 320 adapted to enter notch 315. In Fig. 11 this pin is shown as withdrawn from notch 315, to illustrate how the weight can be released from its actuating mechanism to operate it by hand. Slide 319 carries on its inner end a cam roll 321, running in a cam on a hub 322 located within the cam drum 60. A development of the surface of this cam is shown in Fig. 16, together with various positions assumed relative to it by the cam roll. The representation is diagrammatic, as the roll moves only parallel to the axis of the cam, while the cam revolves alternately back and forth.

It will be remembered that cam drum 60 has imparted to it by its reciprocating movement a compound rotative movement, having a resultant rotation in one direction attained through alternate forward and retrograde steps, the former being always greater than the latter. Hub 322 partakes of this motion, and the cam thereon gives to slide 319 a reciprocating motion. Specifically, the slide 319 is positively urged to raise the weight 308 past the vertical, and then allow the weight to travel of its own force.

Hub 322 is provided with shoulders 323 and 324, which define the limits of reciprocation of the cam roll; and between the shoulders are a plurality of fingers 325, serving as switches to direct the path of the roll. The fingers are spring-pressed against the shoulders by springs 326, one for each pair of fingers (one only being illustrated in Fig. 16 for the sake of clearness), which are anchored to studs 327 projecting from the hub and pass through shanks 328 of the fingers (Fig. 17). The motion of the cam roll may best be seen from a study of the arrows in Fig. 16, remembering that the hub rotates forward and back in the direction of the double arrow, and that the cam roll reciprocates in a straight line at right angles to this. The arrows on the full line indicate one cycle of the cam roll's operation, and the arrows on the dotted line indicate the next succeeding cycle.

It should be observed that, after the cam roll passes the centerline of the cam, it is unrestrained except as it may be impelled from behind. This is for the reason that the actual beating is done solely by weight 308 and not by the cam. The cam acts on slide 319 to rotate shaft 310, through dog 318 and either pin 316 or pin 317, and moves weight 308 to its vertical position. The weight then falls over toward the other side, driving the beater against the side of the casing, as described.

In Fig. 12 is shown a modification of the beater, designed to both position the anchoring wires z and beat the side of the casing. Plates 300 and the hammer portion 301 are as before, except that the hammer portion is somewhat narrower and seats higher up on the side of the tire, but an additional ring 330 is provided. This ring has rounded axial grooves 331 which slide on the heads of studs 332 screwed into plate 300, thus guiding the ring while allowing axial motion relative to the hammer portion. Ring 330 is pressed towards the casing by leaf springs 333, attached at 334 to the plate 300. By this arrangement ring 330 always reaches the tire before the hammer portion and has a chance to adjust wire z before the beating action occurs. Fig. 12 shows in dotted lines the position of the parts after the casing has been built out by the application of several layers of cords; the ring 330, however, being kept in the full line position by the spring.

*Cord cutting mechanism (Figs. 1, 11, 43, 46, 47, 48, 49 and 50).*

When work on one core has been finished, it is brought close to the empty core, as shown in Fig. 11, and the cords are started around the second core. When they have been secured to this core, the cords extending between the two cores are severed, and the completed casing removed. The cutting mechanism for accomplishing this purpose will now be described.

Through sleeve 305 of one of the core supports extends a shaft 400 carrying at the end adjacent the core an arm 401. Pivoted to the arm is a bar 402, having a slot 403 running on a pin 404 on plate 304, and a knife 405 secured to its end. Studs 406 and 407 project from the plate 304 and serve to clamp the bar 402 between them when it is moved by the rotation of shaft 400 into the position shown in dotted lines in Fig. 48. Further rotation of the shaft carries with it both the bar and the plate. It will be seen that rotating shaft 400 serves two purposes. First, it projects the knife from its inoperative to its operative position; and, second, it rotates the knife to cut the cords around the whole circumference. When the cords have been cut, the two cores are separated, and plate 304 rotated manually to bring the knife to an inoperative position. Holes 408 in disk 304 may be utilized for the reception of a spanner for this purpose if desired. They also serve as a means for getting at the squared recess in pinion 75. As the cores are always together at the time the cutting is done, only one cutting mechanism is provided, this being located on either one of the core supports.

The mechanism for rotating shaft 400 will now be described. On the outer end of the shaft is a bevel gear 409 meshing with a similar gear 410 mounted for rotation in a bearing 411. A collar 412 holds the bearing against gear 409, and all these parts move with the reciprocations of sleeve 305 described above. To guide the bearing during these reciprocations a forked guide 413 is provided. Gear 410 receives its motion from a pinion 414, through universal joints 415 and 416, and a telescopic connection 417 (Fig. 1). Pinion 414 meshes with a gear 418 slidable on, but rotatable with, a shaft 419, and both pinion and gear are carried by a bracket 420 depending from the core supporting slide 54.

Shaft 4 carries a gear 421, meshing with an idler gear 422, which meshes with a hubbed gear 423 free to rotate on shaft 419. Keyed to the hub of this gear is a member 424 having a radial guideway for a dog 425, shown in detail in Fig. 50. This dog is adapted to seat in a notch 426 in a sleeve 427 keyed to shaft 419 but, when the cutting device is not operated, is held from dropping into the seat by a slide 428 having a cam-shaped foot 429 over which a pin 430 on the dog rides. When the slide is in the position of Fig. 48, the pin 430 rides over cam 429 at every rotation of gear 423, but, if the slide be raised, pin 430 is allowed to pass under the cam, and the dog drops into slot 426, causing shaft 419 to rotate with gear 423 until the dog is drawn out of the slot by again lowering cam 429 into position. To permit of the slide being operated in this way, it is mounted for reciprocation in a guide 431 on a bracket 432 of the main frame and has a pin 433 running in a slot 434 in one end of a lever pivoted to bracket 432, and terminating in a treadle 435. By depressing this treadle, the cutting mechanism is set in motion, and it will continue in motion until the treadle is released. To prevent overrun of the shaft 419, a brake band 436 surrounds a hub 437 on the shaft and may be adjusted to the desired pressure by a bolt 438.

*General operation.*

The operation will be described with particular reference to Fig. 30, and the positions of the core lettered from a to f on that figure. To start the manufacture of a casing, assuming that the machine is being put into operation for the first time, or that new lengths of cords are being used, the cords, led from guide 100, are fastened about an anchoring wire z held to the side of the core in any convenient way, and the core is brought to position a. The core is preferably rotated during this movement relative to the guide so that the cords will lie diagonally of the core. This is accomplished by the action of cam 60. Care must be taken that all the cords are brought to approximately the same tension. In this position, the core-supporting slide is coupled to the main slide by dowels 55, and by means of the main clutch the slides and core are brought to position b. During the motion from a to b, the tensioning mechanism will be active, and wires 200 will draw the cords down as shown. The cord-feeding mechanism is inactive during this period, but the core is rotating in the reverse direction so as to keep the cords in their diagonal position.

When the core has arrived in position b, the machine is stopped by the automatic clutch. The operator then secures an anchoring wire in place in any suitable manner. This may be done by welding the ends of the wire, or by twisting them together, or by a suitable ferrule or clamp. None of these means form any part of my present invention. When the operator has completed the securing of the anchoring wire, the tensioning mechanism is released by pressing foot lever 245 or 246, and the machine is started by pressing treadle 35. The winding mechanism of the tensioning device draws the wires 200 out of the way before the core passes it.

As the core travels from b to c, the core continues to rotate in the reverse direction, and the cord-feeding mechanism is operated to take up the slack in the cord. The reverse rotation aids the cords in keeping their proper relation, and gets the various elements in position for the laying on of the next layer of cords. As the core passes $c$, the beater acts to compact the cords and the recently placed anchoring wire and remains in position as the core travels to $d$. During this motion, the core changes its direction of rotation and rotates in its original direction, causing the cords to be laid diagonally across it. At the point $c$ the reverse rotation has caused the angle of the free portion of the cords relative to the core to be straightened out, and the renewal of rotation in the original direction serves to cause the cords to assume relative to the core an angular position in the same direction circumferentially as they assumed in the first layer. Each individual cord is therefore laid across the core in a succession of courses progressing in a zig-zag path along the circumference of the core. The point $c$ may vary in actual location from that shown in Fig. 30 to a position where the unattached portions of the cords project inwardly substantially in the plane of the guide. This latter position will be the true one where the cords are under considerable tension, as under these circumstances they will not follow the undercut portion of the core as shown but will remain in a position parallel to the plane of the core, substantially as shown at the left hand side of position $b$. The core changes its directions of reciprocation and rotation at $d$, and proceeds to $e$, the second tensioning device meanwhile working, where the machine is again stopped by the automatic clutch.

This cycle of operation is continued until the desired number of layers have been laid on. The other core is then brought into position, as shown in Fig. 11, and the building of a casing on it started, as also shown by that figure. This carrying of the cords from one core to another occurs at either point $f$ or $e$, depending on which core is to be started. After the cords are secured to the second core, the operator presses treadle 435, bringing the cutting mechanism into operation to sever the cords between the cores. The machine is then started by the clutches previously described to continue the work on the second core. At no time until the supply of cords is exhausted are there free ends of cords, unattached to a core, so that there is no danger of the cords becoming disordered or snarled.

While I have described one form of machine in which my invention may be embodied, I realize that the mechanical operations can be carried out by different mechanisms, and do not limit myself to the structure shown.

For example, the spacing of the cords may be greater than that shown and may cover any desired portion of the circumference although it is preferred to arrange the cords in a balanced system, so that the operation of the tensioning means will not be interfered with. It is further obvious that, instead of rotating and reciprocating the core past the cord feeding units, the latter may have the motions imparted to them; or the core may be rotated or reciprocated and the cord feeding units have the other movement.

The method practiced in building a tire according to my present invention is fully described above in discussing the operation of the machine, but may be summarized as follows. The ends of the circumferential series of cords are secured adjacent the side of the core, and the cords are guided from a point outside the path of motion of the core as by ring 100. The cords are then simultaneously laid across the core by causing relative reciprocation between the core and the guide. This reciprocation is in effect a changing of the position of the plane of the core from one side to the other of the plane of the guide. During this reciprocation, if the cords are to be laid diagonally, the core and guide are relatively rotated. The reciprocation is continued until an excess length of cord has been drawn out sufficient to enable the cords to be gathered or restricted to the bead diameter. This may be done by a separate tension means, such as the contractile circular wire described above, or by the anchoring means itself. The gathering may be assisted by a slacking off of the cords, either from the cord feed itself, or by moving the core nearer the guide. During the reciprocation in the opposite direction from that during the original laying of the cords over the core, a relative rotation between the core and the guide is given in the opposite direction from that during the first reciprocation until the cords reach a position where they extend in planes passing through the axis of the core—or, in other words, are straight and not diagonal with respect thereto. Then a relative rotation in the opposite direction is given, accompanying a continuation of the reverse reciprocation, whereby a second layer of cords is laid across the core at an angle with respect to the first layer. These operations are continued until a casing having the desired number of plies is built up, whereupon the building of a casing on the second core is started as described above.

While I have throughout the specification referred to the elements of which the tire carcass is built as "cords" it should be understood that I contemplate using any suitable form of building elements. In particular, and as pointed out in my said copending application Serial No. 264,960, it is in some cases desirable to use instead of single cords, a strip of material preferably composed of a plurality of cords embedded in rubber.

What I claim is—

1. In a machine of the class described, a core, a support for the core, means for laying a plurality of building elements about the sides and crown of the core and for holding such elements in position to receive and enclose an anchoring wire, and means for compacting the elements at the side of the core.

2. In a machine of the class described, a core, a support for the core, means for laying a plurality of building elements about the sides and crown of the core, means for tensioning such elements and holding them in position to receive and enclose an anchoring wire, and means for compacting the elements at the side of the core.

3. In a machine of the class described, a core, a support for the core, means for laying a plurality of building elements about the sides and crown of the core and for holding such elements in position to receive an anchoring wire, means for positioning the anchoring wire, and means for compacting the elements at the side of the core.

4. In a machine of the class described, a core, a support for the core, means for laying a plurality of building elements about the sides and crown of the core, means for tensioning such elements and holding them in position to receive an anchoring wire, means for positioning the anchoring wire, and means for compacting the elements at the side of the core.

5. In a machine of the class described, a core on which an unfinished tire structure may be supported, and compacting means for the side of the tire structure comprising an annular member adapted for motion toward and away from the tire structure.

6. In a machine of the class described, a core on which an unfinished tire structure may be supported, compacting means for the side of the tire structure comprising an annular member, and means to move the member toward and away from the tire structure.

7. In a machine of the class described, a core on which an embryonic tire structure may be supported, and compacting means for the side of the tire structure comprising an annular member movable toward and away from the tire structure, weight means to force the member sharply against the tire structure, and means to release the weight means.

8. In a machine of the class described, an axially reciprocating core on which an embryonic tire structure may be supported, means for laying a plurality of cords across the core during the reciprocation thereof, and means operable during the reciprocation to compact previously laid layers.

9. In a tire building apparatus, a circular convex tire building support, guiding means for supplying thereto a circumferentially complete ply of tire building material, means for constricting the material for the application of a bead anchorage between the support and the guiding means, and means for forcing against the support the anchorage applied to said constricted portion of the material.

10. In a tire building apparatus, a circular convex tire building support, means circumferentially arranged surrounding the support for supplying thereto a circumferentially complete ply of building material, means for carrying down the side of the support the material so supplied, thereby permitting the application there of a bead anchorage, and means for forcing the material and anchorage against the support.

THOMAS MIDGLEY.